(12) United States Patent
Wu

(10) Patent No.: US 11,988,402 B2
(45) Date of Patent: May 21, 2024

(54) AIR CONDITIONER, CONTROL METHOD THEREOF AND READABLE STORAGE MEDIUM

(71) Applicant: GD MIDEA AIR-CONDITIONING EQUIPMENT CO., LTD., Foshan (CN)

(72) Inventor: Yangyang Wu, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 273 days.

(21) Appl. No.: 17/763,388

(22) PCT Filed: Apr. 1, 2020

(86) PCT No.: PCT/CN2020/082761
§ 371 (c)(1),
(2) Date: Mar. 24, 2022

(87) PCT Pub. No.: WO2021/057006
PCT Pub. Date: Apr. 1, 2021

(65) Prior Publication Data
US 2022/0364759 A1  Nov. 17, 2022

(30) Foreign Application Priority Data
Sep. 26, 2019 (CN) .............................. 201910922498

(51) Int. Cl.
*F24F 11/64* (2018.01)
*F24F 11/61* (2018.01)
(Continued)

(52) U.S. Cl.
CPC .............. *F24F 11/64* (2018.01); *F24F 11/61* (2018.01); *F24F 11/86* (2018.01); *F24F 2110/10* (2018.01)

(58) Field of Classification Search
CPC .. F24F 11/30; F24F 11/61; F24F 11/64; F24F 11/86; F24F 2110/10; F24F 2140/20; Y02B 30/70
See application file for complete search history.

(56) References Cited

U.S. PATENT DOCUMENTS

2017/0122635 A1   5/2017   Zhang et al.

FOREIGN PATENT DOCUMENTS

| CN | 104006504 A | 8/2014 |
| CN | 104764168 A | 7/2015 |

(Continued)

OTHER PUBLICATIONS

World Intellectual Property Organization (WIPO) International Search Report and Written Opinion for PCT/CN2020/082761 dated Jun. 30, 2020 16 pages (with translation).

(Continued)

*Primary Examiner* — Emmanuel E Duke
(74) *Attorney, Agent, or Firm* — Anova Law Group, PLLC

(57) ABSTRACT

A control method of an air conditioner includes obtaining a first operating frequency of a compressor of the air conditioner; in response to the first operating frequency being greater than or equal to a preset frequency, obtaining a current temperature of an evaporator of the air conditioner; and in response to the current temperature being less than a preset temperature, controlling the compressor to operate according to a second operating frequency greater than the first operating frequency.

20 Claims, 2 Drawing Sheets

(51) Int. Cl.
    *F24F 11/86*    (2018.01)
    *F24F 110/10*   (2018.01)

(56)          References Cited

FOREIGN PATENT DOCUMENTS

| CN | 105042807 | A |   | 11/2015 |       |          |
|----|-----------|---|---|---------|-------|----------|
| CN | 105371531 | A |   | 3/2016  |       |          |
| CN | 106091479 | A |   | 11/2016 |       |          |
| CN | 106524593 | A |   | 3/2017  |       |          |
| CN | 107218741 | A |   | 9/2017  |       |          |
| CN | 109780689 | A |   | 5/2019  |       |          |
| CN | 208887191 | U | * | 5/2019  | ......| B63J 2/12|
| CN | 109964086 | A |   | 7/2019  |       |          |
| CN | 110017588 | A | * | 7/2019  | ......| F24F 11/64|
| CN | 110039970 | A | * | 7/2019  |       |          |
| CN | 110131840 | A |   | 8/2019  |       |          |
| CN | 110608520 | A |   | 12/2019 |       |          |
| CN | 109910557 | B | * | 10/2021 |       |          |
| JP | 2004156858| A |   | 6/2004  |       |          |
| JP | 2012198020| A |   | 10/2012 |       |          |
| WO | WO-2019041542 | A1 | * | 3/2019 | ......| F24F 11/65 |
| WO | WO-2019141018 | A1 | * | 7/2019 | ......| F24F 11/64 |

OTHER PUBLICATIONS

The China National Intellectual Property Administration (CNIPA) The First Office Action for Chinese Application 201910922498.X dated Aug. 28, 2020 16 Pages (With Translation).

The China National Intellectual Property Administration (CNIPA) The Second Office Action for Chinese Application 201910922498.X dated Mar. 19, 2021 17 Pages (With Translation).

The China National Intellectual Property Administration (CNIPA) The Notification to Grant Patent Right for Invention for Chinese Application 201910922498.X dated Jun. 17, 2021 5 Pages (With Translation).

* cited by examiner

AIR CONDITIONER, CONTROL METHOD THEREOF AND READABLE STORAGE MEDIUM

CROSS-REFERENCE TO RELATED APPLICATIONS

The present application is a National Stage Entry under 35 U.S.C. § 371 of International Application No. PCT/CN2020/082761, filed on Apr. 1, 2020, which claims priority to Chinese patent application No. 201910922498.X, filed on Sep. 26, 2019 and titled "Air Conditioner, Control Method Thereof and Readable Storage Medium," the entire contents of both of which are incorporated herein by reference.

TECHNICAL FIELD

The present application relates to the field of air conditioners, in particular to an air conditioner, a control method thereof and a readable storage medium.

BACKGROUND

At present, the air conditioner has become an indispensable household appliance in every family, and its reliability directly affects people's satisfaction.

In many markets and scenarios, the air conditioner is often in the operating state for a long time, thus the air inlet of the air conditioner will be dirty and blocked, which will lead to the reduction of air volume through the air inlet of the air conditioner, that is, the air conditioner will operate at low frequencies for a long time, which will make it difficult for the oil return of the air conditioner, and there will be less oil in the compressor of the air conditioner, thereby resulting in wear of the compressor.

SUMMARY

The main purpose of the present application is to provide an air conditioner, a control method thereof and a readable storage medium, which solve the problems of difficult oil return of the air conditioner and wear of the compressor of the air conditioner due to that the air conditioner is operated at a low frequency for a long time.

In order to achieve the above purpose, the present application provides a control method of an air conditioner, which includes:

obtaining a first operating frequency of a compressor of the air conditioner;

the first operating frequency is greater than or equal to a preset frequency, obtaining a current temperature of an evaporator of the air conditioner; and the current temperature is less than a preset temperature, controlling the compressor to operate according to a second operating frequency which is greater than the first operating frequency.

Optionally, the current temperature is less than a preset temperature, controlling the compressor to operate according to a second operating frequency includes:

obtaining a first duration during which the current temperature is less than the preset temperature; and the first duration is greater than or equal to a first preset duration, controlling the compressor to operate according to the second operating frequency.

Optionally, after the obtaining a first duration during which the current temperature is continuously less than the preset temperature, the method further includes:

the first duration is less than the first preset duration, resetting the first duration.

Optionally, a range of the second operating frequency is from 55 Hz to 59 Hz.

Optionally, the controlling the compressor to operate at the second operating frequency includes:

controlling the compressor to gradually increase from the first operating frequency to the second operating frequency.

Optionally, the controlling the compressor to gradually increase from the first operating frequency to the second operating frequency includes:

controlling the compressor to increase from the first operating frequency to the second operating frequency according to a preset adjustment value.

Optionally, the obtaining a first operating frequency of a compressor of the air conditioner includes:

obtaining a plurality of operating frequencies of the compressor; and taking an average of the plurality of operating frequencies as the first operating frequency of the compressor.

Optionally, after the obtaining a current temperature of a heat exchanger an evaporator of the air conditioner, the method further includes:

if the current temperature is greater than or equal to the preset temperature, controlling the compressor to operate according to a rated frequency.

Optionally, the current temperature of the evaporator of the air conditioner is a temperature of a middle part of the evaporator.

Optionally, the controlling the compressor to operate at the second operating frequency includes:

after the controlling the compressor to operate according to the second operating frequency for the return time span, the method.

Optionally, after the controlling the compressor to operate according to the second operating frequency for the return time span, the method further includes:

controlling an operating frequency of the compressor to return to the first operating frequency.

Optionally, after the obtaining a first operating frequency of a compressor of the air conditioner, the method further includes:

the first operating frequency is less than the preset frequency, obtaining a second duration during which the first operating frequency is less than the preset frequency; and the second duration is greater than or equal to a second preset duration, executing the operation of controlling the compressor to operate according to the second operating frequency.

Optionally, after the obtaining a second duration during which the first operating frequency is continuously less than the preset frequency, the method further includes:

the second duration is less than the second preset duration, resetting the second duration.

In addition, in order to achieve the above purpose, the present application also provides a control device of an air conditioner, which includes a memory, a processor and a control program of the air conditioner stored in the memory and executable by the processor. When the control program of the air conditioner is executed by the processor, the following operations of a control method of the air conditioner are realized:

obtaining a first operating frequency of a compressor of the air conditioner;

the first operating frequency is greater than or equal to a preset frequency, obtaining a current temperature of an evaporator of the air conditioner; and the current temperature is less than a preset temperature, controlling the compressor to operate according to a second operating frequency which is greater than the first operating frequency.

In addition, in order to achieve the above purpose, the present application also provides a readable storage medium storing a control program of an air conditioner, when the control program of the air conditioner is executed by a processor, the operations of the control method of the air conditioner as described below are realized:

obtaining a first operating frequency of a compressor of the air conditioner;

the first operating frequency is greater than or equal to a preset frequency, obtaining a current temperature of an evaporator of the air conditioner; and the current temperature is less than a preset temperature, controlling the compressor to operate according to a second operating frequency which is greater than the first operating frequency.

The present application provides an air conditioner, a control method thereof and a readable storage medium. The control method of the air conditioner includes the following operations: obtaining a first operating frequency of a compressor of the air conditioner; the first operating frequency is greater than or equal to a preset frequency, obtaining a current temperature of an evaporator of the air conditioner; the current temperature is less than the preset temperature, controlling the compressor to operate according to a second operating frequency which is greater than the first operating frequency. That is, when the first operating frequency of the compressor is greater than or equal to the preset frequency, and the current temperature of the evaporator is less than the preset temperature, it can be determined that the air conditioner is still operated at a lower frequency. At this time, the compressor is controlled to operate according to the second operating frequency, so that the air conditioner can return oil, thereby increasing the amount of lubricating oil in the compressor of the air conditioner and avoiding the wear of the compressor during operation.

BRIEF DESCRIPTION OF THE DRAWINGS

In order to more clearly explain the technical solutions in the embodiments or examples of the present application, the drawings needed in the embodiments or exemplary description will be briefly introduced in the following. Obviously, the drawings in the following description are only some examples of the present application. For ordinary skills in the art, other drawings can be obtained according to these drawings without creative efforts.

The realization of the purposes, functional features and advantages of the present application will be further explained with reference to the accompanying drawings in combination with the embodiments.

DETAILED DESCRIPTION OF THE EMBODIMENTS

It should be understood that the specific embodiments described herein are intended to be explanatory only and are not intended to limit the present application.

A main solution of embodiments of the present application is: obtaining a first operating frequency of a compressor of an air conditioner; the first operating frequency is greater than or equal to a preset frequency, obtaining a current temperature of an evaporator of the air conditioner; the current temperature is less than a preset temperature, controlling the compressor to operate according to a second operating frequency which is greater than the first operating frequency.

As the air conditioner in the exemplary technology is often in the operating state for a long time, the air inlet of the air conditioner will be dirty and blocked, which will lead to the reduction of air volume through the air inlet of the air conditioner, that is, the air conditioner will operate at low frequencies for a long time, which will make it difficult for the oil to return to the compressor of the air conditioner, and there will be less oil in the compressor of the air conditioner, thereby resulting in wear of the compressor.

The present application provides a solution, which includes the following operations: obtaining a first operating frequency of a compressor of an air conditioner; the first operating frequency is greater than or equal to a preset frequency, obtaining a current temperature of an evaporator of the air conditioner; the current temperature is less than a preset temperature, controlling the compressor to operate according to a second operating frequency which is greater than the first operating frequency. That is, when the first operating frequency of the compressor is greater than or equal to the preset frequency and the current temperature of the evaporator is less than the preset temperature, the compressor is controlled to operate according to the second operating frequency, so that oil can return to the compressor of the air conditioner, and the amount of lubricating oil in the compressor of the air conditioner is increased and the wear of the compressor during operation is avoided.

Figure 1:
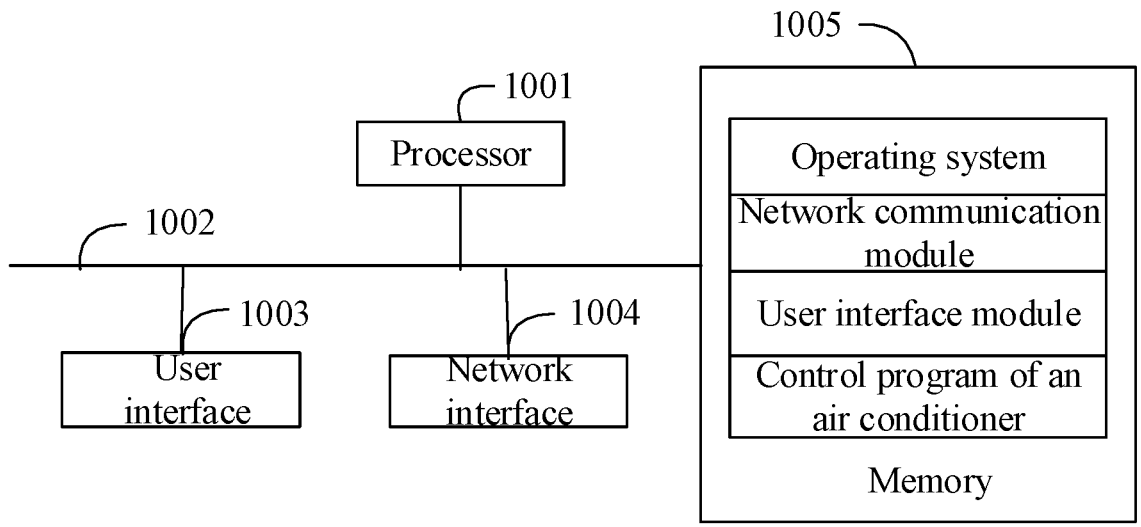
FIG. 1 is a schematic structural diagram of a terminal of a hardware running environment related to solutions of embodiments of the present application.

As shown in FIG. 1, FIG. 1 is a schematic diagram of a hardware running environment of a terminal involved in the embodiments of the present application.

As shown in FIG. 1, the terminal can include a processor 1001, such as a CPU, a network interface 1004, a user interface 1003, a memory 1005 and a communication bus 1002. The communication bus 1002 is used to realize connection and communication between these components. The user interface 1003 can include a display, an input unit such as a keyboard and a remote controller, and the user interface 1003 may optionally also include a standard wired interface and a wireless interface. The network interface 1004 may optionally include a standard wired interface and a wireless interface. The memory 1005 may be a (memory (non-volatile memory), such as a disk memory. The memory 1005 may optionally be a storage device independent of the processor 1001 described above.

Those skilled in the art can understand that the structure of the terminal shown in FIG. 1 does not constitute a limitation to the terminal, which may include more or less components than those shown in the figure, or some components combined or different components arrangement.

As shown in FIG. 1, the memory 1005, as a computer storage medium, can include an operating system, a network communication module, a user interface module and a control program of an air conditioner.

In the terminal shown in FIG. 1, the network interface 1004 is mainly used to connect with a back-end server for data communication with the back-end server. The user interface 1003 is mainly used to connect with the client and communicate with the client. The processor 1001 can be used to call the control program of the air conditioner stored in the memory 1005 and perform the following operations:

obtaining a first operating frequency of a compressor of the air conditioner;

the first operating frequency is greater than or equal to a preset frequency, obtaining a current temperature of an evaporator of the air conditioner;

the current temperature is less than a preset temperature, controlling the compressor to operate according to a second operating frequency which is greater than the first operating frequency.

Further, the processor 1001 can call the control program of the air conditioner stored in the memory 1005, and also perform the following operations:

obtaining a first duration during which the current temperature is less than the preset temperature;

the first duration is greater than or equal to a first preset duration, controlling the compressor to operate according to the second operating frequency.

Further, the processor 1001 can call the control program of the air conditioner stored in the memory 1005, and also perform the following operations:

the first duration is less than the first preset duration, resetting the first duration.

Further, the processor 1001 can call the control program of the air conditioner stored in the memory 1005, and also perform the following operation:

a range of the second operating frequency being 55 Hz to 59 Hz.

Further, the processor 1001 can call the control program of the air conditioner stored in the memory 1005, and also perform the following operation:

controlling the compressor to gradually increase from the first operating frequency to the second operating frequency.

Further, the processor 1001 can call the control program of the air conditioner stored in the memory 1005, and also perform the following operation:

controlling the compressor to increase from the first operating frequency to the second operating frequency according to a preset adjustment value.

Further, the processor 1001 can call the control program of the air conditioner stored in the memory 1005, and also perform the following operations:

obtaining a plurality of operating frequencies of the compressor; and taking an average of the plurality of operating frequencies as the first operating frequency of the compressor.

Further, the processor 1001 can call the control program of the air conditioner stored in the memory 1005, and also perform the following operations:

in a determination that the current temperature is greater than or equal to the preset temperature, controlling the compressor to operate according to a rated frequency.

Further, the processor 1001 can call the control program of the air conditioner stored in the memory 1005, and also perform the following operation:

the current temperature of the evaporator of the air conditioner being a temperature of a middle part of the evaporator.

Further, the processor 1001 can call the control program of the air conditioner stored in the memory 1005, and also perform the following operations:

obtaining a current amount of lubricating oil in the compressor; and determining a return time span for lubricating oil to return to the compressor according to the current amount; and controlling the compressor to operate according to the second operating frequency for the return time span.

Further, the processor 1001 can call the control program of the air conditioner stored in the memory 1005, and also perform the following operations:

controlling the operating frequency of the compressor to return to the first operating frequency.

Further, the processor 1001 can call the control program of the air conditioner stored in the memory 1005, and also perform the following operations:

the first operating frequency is less than the preset frequency, obtaining a second duration during which the first operating frequency is less than the preset frequency;

the second duration is greater than or equal to a second preset duration, executing the operation of controlling the compressor to operate according to the second operating frequency.

Further, the processor 1001 can call the control program of the air conditioner stored in the memory 1005, and also perform the following operation:

the second duration is less than the second preset duration, resetting the second duration.

The present application provides a control method of an air conditioner.

Figure 2:
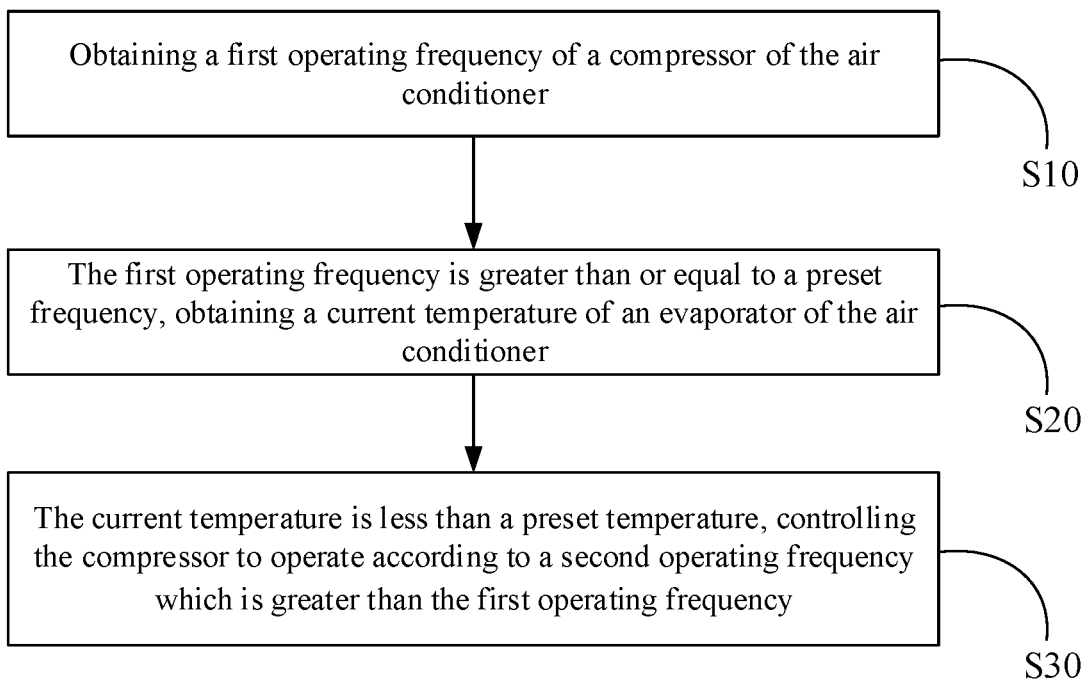
FIG. 2 is a flowchart of a first embodiment of a control method of an air conditioner.

Referring to FIG. 2, FIG. 2 is a flowchart of a first embodiment of the control method of the air conditioner.

This embodiment provides a control method of an air conditioner, which includes the following operations:

S10, obtaining a first operating frequency of a compressor of the air conditioner;

S20, the first operating frequency is greater than or equal to a preset frequency, obtaining a current temperature of an evaporator of the air conditioner;

S30, the current temperature is less than a preset temperature, controlling the compressor to operate according to a second operating frequency which is greater than the first operating frequency.

When the air conditioner is started, the first operating frequency of the compressor of the air conditioner is obtained by a frequency obtaining device, where the first operating frequency of the compressor can be obtained periodically, for example, the first operating frequency of the compressor can be obtained once every ten seconds. Optionally, a plurality of operating frequencies of the compressor can be obtained in a preset time period, and an average can be calculated through the plurality of operating frequencies, and the average of the plurality of operating frequencies can be taken as the first operating frequency of the compressor.

Further, after the first operating frequency of the compressor is obtained, whether the first operating frequency is greater than or equal to the preset frequency is judged, when the first operating frequency is greater than or equal to the preset frequency, the current temperature of the evaporator of the air conditioner is obtained. The current temperature is the temperature of the middle part of the evaporator, and the temperature of the middle part of the evaporator reflects the high pressure of the compressor.

Further, the preset frequency is 25 Hz. Of course, in other embodiments, the preset frequency can be regarded as having been set or can be set according to the performance of the air conditioner, and there is no limitation here.

Further, when the current temperature is less than the preset temperature, the air conditioner is controlled to perform an oil return action. The preset temperature can be a preset temperature value, for example, the preset temperature is 3° C. Or, the preset temperature can be a preset temperature range, for example, the preset temperature range is from 2° C. to 4° C.

Further, the oil return action is to control the compressor to operate according to the second operating frequency which is greater than the first operating frequency. Specifically, the second operating frequency of the compressor is obtained, where the second operating frequency is an oil return frequency of the compressor. The compressor is controlled to operate according to the second operating frequency. That is, the operating frequency of the compressor is gradually increased from the first operating frequency to the second operating frequency and maintained at the second operating frequency till the oil return is finished. Or, the operating frequency of the compressor is controlled to increase from the first operating frequency to the second operating frequency according to a preset adjustment value, the preset adjustment value can be a percentage, the operating frequency of the compressor is increased by the preset percentage on the basis of the first operating frequency to make the operating frequency of the compressor reach the second operating frequency, for example, when the preset adjustment value is 10%, the second operating frequency can be obtained by increasing the first operating frequency by 10%. Or, the preset adjustment value can be a numerical value, and the adjusted second operating frequency can be obtained by adding the adjustment value to the first operating frequency.

Further, the second operating frequency is any frequency value in the range of 55 Hz to 59 Hz. In this embodiment, the second operating frequency is set to be 57 Hz. Of course, in other embodiments, the second operating frequency is not limited.

Further, because the first operating frequency of the compressor is greater than or equal to the preset frequency, that is, the first operating frequency is greater than 25 Hz, at this time, it can be determined whether the air conditioner is operated at a lower frequency by judging the temperature at the middle part of the evaporator, that is, whether the current temperature of this embodiment is less than the preset temperature value, or whether the current temperature is within the preset temperature range, it can be determined that the air conditioner is still operated at the lower frequency, that is, at this time, the air conditioner is controlled to execute the oil return action and the compressor is operated at the second operating frequency, that is, the compressor is controlled to operate at the second operating frequency.

In detail, a first duration that the current temperature is less than the preset temperature is obtained, that is, the time duration that the temperature at the middle part of the evaporator is less than the preset temperature is obtained, whether the first duration is greater than or equal to the first preset duration is determined, when the first duration is greater than or equal to the first preset duration, the compressor is controlled to operate according to the second operating frequency. The first preset duration is 30 min, that is, when the first duration is greater than or equal to 30 min, it can be determined that the air conditioner is still operated at the lower frequency. At this time, the compressor can be controlled to operate at the second operating frequency.

Because the first duration is the continuous time span, that is, the time span during which the current temperature is less than the preset temperature, that is, when the current temperature is greater than or equal to the preset temperature at a certain time point, this time point is taken as an endpoint of the first duration, for example, timing from the first minute when the current temperature is less than the preset temperature, at the twentieth minute, the current temperature is greater than the preset temperature, that is, the first duration is twenty minutes, at this time, the first duration is less than the first preset duration, and the first duration is reset, that is, the first duration is reset to zero and repeats to count the time during which the current temperature is less than the preset temperature.

Further, if the first operating frequency of the compressor is greater than or equal to the preset frequency, and the first duration is less than the first preset duration, the compressor of the air conditioner operates at a higher frequency at a certain time point in the first preset duration, at this time, the air conditioner performs the normal oil return action, that is, controls the compressor to operate according to the second operating frequency.

Further, when the current temperature is greater than or equal to the preset temperature, the compressor operates according to the rated frequency, that is, the compressor still operates at a higher frequency. At this time, the air conditioner performs the normal oil return action, that is, the operating frequency of the compressor can be reduced from the rated frequency to the second operating frequency and maintained at the second operating frequency till that the oil returning to the compressor is finished.

Further, when the compressor is operating, lubricating oil is needed to reduce the abrasion of the compressor in the process, the lubricating oil is stored in a cavity of the compressor, that is, in the process of controlling the compressor to operate according to the second operating frequency, the current amount of the lubricating oil in the compressor is obtained, and the return time span of the compressor is determined according to the current amount. After the return time span is determined, the compressor is controlled to operate according to the second operating frequency for the return time span.

Specifically, the return time span is any value in the range of 70s to 110s. That is, when the current amount is high, the return time span can be set to be 70s, that is, the compressor is controlled to operate at the second operating frequency for 70s. When the current amount is low, the return time span can be set to be 110s, and the compressor can be controlled to operate at the second operating frequency for 110s. In this embodiment, the return time span is set to be 90s, so that the return of the oil to the compressor is sufficient and the wear of the compressor during operation is avoided. Of course, in other embodiments, the return time span can also be set according to specific requirements, which is not limited here.

Further, when the air conditioner finishes the oil return action, that is, the time duration of controlling the compressor to operate according to the second operating frequency reaches the return time span, at this time, the lubricating oil in the compressor is sufficient, which can ensure that there is no dry grinding during the operation of the compressor and avoid the compressor from being worn.

Further, after the oil return action is executed, that is, the time duration of controlling the compressor to operate according to the second operating frequency reaches the return time span, the operating frequency of the compressor is controlled to return to the first operating frequency to ensure the normal operation of the air conditioner.

In the embodiment of the present application, the control method of the air conditioner includes the following operations: obtaining a first operating frequency of a compressor of the air conditioner; the first operating frequency is greater than or equal to a preset frequency, obtaining a current temperature of an evaporator of the air conditioner; the current temperature is less than a preset temperature, controlling the compressor to operate according to a second operating frequency which is greater than the first operating frequency. That is, when the first operating frequency of the compressor is greater than or equal to the preset frequency and the current temperature of the evaporator is less than the preset temperature, it can be determined that the air conditioner is still operated at a lower frequency. At this time, the compressor is controlled to operate according to the second operating frequency, so that the air conditioner can return oil, thereby increasing the amount of lubricating oil in the compressor of the air conditioner and avoiding the wear of the compressor during operation.

Figure 3:
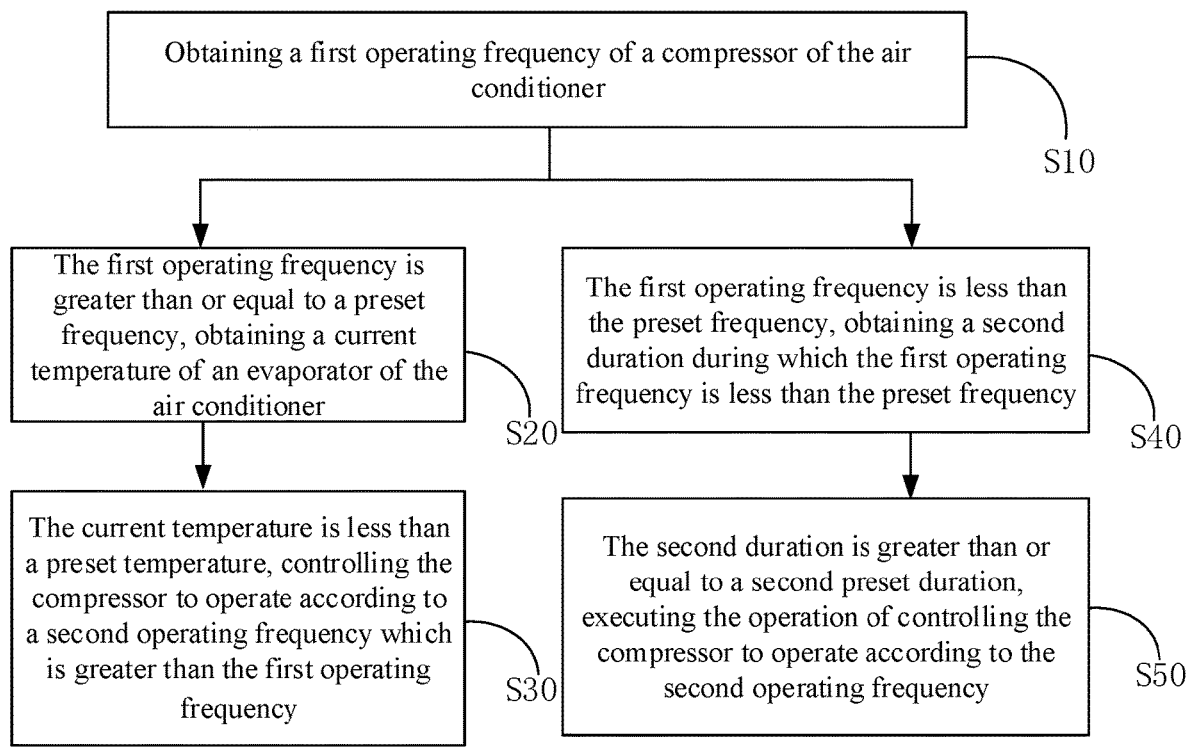
FIG. 3 is a flowchart of a second embodiment of the control method of the air conditioner.

Further, referring to FIG. 3, a second embodiment of the present application is proposed based on the first embodiment. In this embodiment, after the operation of obtaining a first operating frequency of a compressor of the air conditioner, the control method of the air conditioner further includes:

S40, the first operating frequency is less than the preset frequency, obtaining a second duration during which the first operating frequency is less than the preset frequency;

S50, the second duration is greater than or equal to a second preset duration, executing the operation of controlling the compressor to operate according to the second operating frequency.

When the air conditioner is started, the first operating frequency of the compressor of the air conditioner is obtained by the frequency obtaining device, where the first operating frequency of the compressor can be obtained periodically, for example, the first operating frequency of the compressor can be obtained once every ten seconds. Or, a plurality of operating frequencies of the compressor can be obtained in a preset time period, and an average can be calculated through the plurality of operating frequencies, and the average of the plurality of operating frequencies can be taken as the first operating frequency of the compressor.

Further, after the first operating frequency of the compressor is obtained, whether the first operating frequency is less than the preset frequency is judged, when the first operating frequency is less than the preset frequency, the second duration of the first operating frequency is obtained. The preset frequency is 25 Hz. Of course, in other embodiments, the preset frequency can be regarded as having been set or can be set according to the performance of the air conditioner, and there is no limitation here.

Further, it is judged whether the second duration is greater than or equal to the second preset duration, when the second duration is greater than or equal to the second preset duration, the operation of controlling the compressor to operate according to the second operating frequency is executed. The second preset duration is 30 min, that is, when the second duration is greater than or equal to 30 min, it can be determined that the air conditioner operates at lower frequencies for 30 min, at this time, the compressor can be controlled to operate at the second operating frequency.

Because the second duration is the continuous time span, that is, the time span during which the first operating frequency is less than the preset frequency, that is, when the first operating frequency is less than the preset frequency at a certain time point, the time point is taken as an endpoint of the second duration, for example, counting from the first minute when the first operating frequency is less than the preset frequency, at the tenth minute, the first operating frequency is greater than or equal to the preset frequency, that is, the second duration is ten minutes, at this time, the second duration is less than the second preset duration, and the second duration is reset, that is, the second duration is reset to zero and repeats to count the time during which the first operating frequency is less than the preset frequency.

Further, if the first operating frequency of the compressor is greater than or equal to the preset frequency, the compressor of the air conditioner operates at a higher frequency at a certain time point during the second preset time period, at this time, the air conditioner performs the normal oil return action.

Further, the above oil return action is to control the compressor to operate according to the second operating frequency which is greater than the first operating frequency. In detail, the second operating frequency of the compressor is obtained according to the oil return action, where the second operating frequency is an oil return frequency of the compressor. The compressor is controlled to operate according to the second operating frequency. That is, the operating frequency of the compressor is gradually increased from the first operating frequency to the second operating frequency and maintained at the second operating frequency till the oil returning to the compressor is finished. Or, the compressor is controlled to increase from the first operating frequency to the second operating frequency according to a preset adjustment value, the preset adjustment value can be a percentage, the operating frequency of the compressor is increased by the preset percentage on the basis of the first operating frequency to make the operating frequency of the compressor reach the second operating frequency, for example, when the preset adjustment value is 10%, the second operating frequency can be obtained by increasing the first operating frequency by 10%. Or, the preset adjustment value can be a numerical value, and the adjusted second operating frequency can be obtained by adding the adjustment value to the first operating frequency.

Further, the second operating frequency is any frequency value in the range of 55 Hz to 59 Hz. In this embodiment, the second operating frequency is set to be 57 Hz. Of course, in other embodiments, the second operating frequency is not limited.

Further, when the compressor is operating, lubricating oil is needed to reduce the abrasion of the compressor in the process, the lubricating oil is stored in a cavity of the compressor, that is, in the process of controlling the compressor to operate according to the second operating frequency, the current amount of the lubricating oil in the compressor is obtained, and the return time span of the compressor is determined according to the current amount. After the return time span is determined, the compressor is controlled to operate according to the second operating frequency for the return time span.

Specifically, the return time span is any value in the range of 70s to 110s. That is, when the current amount is high, the return time span can be set to be 70s, that is, the compressor is controlled to operate at the second operating frequency for 70s. When the current amount is low, the return time span can be set to be 110s, and the compressor can be controlled to operate at the second operating frequency for 110s. In this embodiment, the return time span is set to be 90s, so that the return of the oil to the compressor is sufficient and the wear of the compressor during operating is avoided. Of course, in other embodiments, the return time span can also be set according to specific requirements, which is not limited here.

In the embodiments of the present application, the control method of the air conditioner includes the following operations: the first operating frequency is less than the preset frequency, obtaining a second duration during which the first operating frequency is less than the preset frequency; the second duration is greater than or equal to the second preset duration, executing the operation of controlling the compressor to operate at the second operating frequency. That is, when the first operating frequency of the compressor is less than the preset frequency and the second duration is greater than or equal to the second preset duration, it can be determined that the air conditioner operates at a lower frequency. At this time, the compressor is controlled to operate according to the second operating frequency, so that the air conditioner can return oil, thereby increasing the amount of lubricating oil in the compressor of the air conditioner and avoiding the wear of the compressor during operation.

The present application also provides an air conditioner, which includes a memory, a processor, and a control program of the air conditioner stored in the memory and executable by the processor, when the control program of the air conditioner is executed by the processor, the operations of the control method of the air conditioner as described in the above embodiments are realized.

The present application also provides a readable storage medium which stores a control program of an air conditioner, when the control program of the air conditioner is executed by a processor, the operations of the control method of the air conditioner as described in any one of the above embodiments are realized.

The above serial numbers of the embodiments of the present application are for description only and do not represent the advantages and disadvantages of the embodiments.

From the above description of the embodiments, it will be clear to those skilled in the art that the method of the above embodiments can be implemented by means of software plus the necessary common hardware platform, and of course also by means of hardware, but in many cases the former is preferred. Based on this understanding, the technical solution of the present application may be embodied in the form of a software product which is stored on a storage medium (such as ROM/RAM, magnetic disk, CD-ROM), in essence or in part contributing to the prior art, and includes instructions for causing a terminal device (which can be a mobile phone, a computer, a server, an air conditioning system, or a network equipment, etc.) to execute the methods described in each embodiment of the present application.

It should be noted that in this article, the term "include," "comprise" or any other variant thereof is intended to cover non-exclusive inclusion, so that a process, method, article or system that includes a set of elements includes not only those elements but also other elements that are not explicitly listed, or also elements inherent to such a process, method, article or system. In the absence of further limitations, an element defined with the statement "include a . . . " does not preclude the existence of another identical element in the process, method, article or system in which the element is included.

The above are only optional embodiments of the present application, and are not therefore limiting the scope of the present application. Any equivalent structure or equivalent process transformation made by using the contents of the specification and drawings of the present application, or any direct/indirect application in other related technical fields is included in the claimed scope of the present application.

What is claimed is:

1. A control method of an air conditioner comprising:
   obtaining a first operating frequency of a compressor of the air conditioner;
   in response to the first operating frequency being greater than or equal to a preset frequency, obtaining a current temperature of an evaporator of the air conditioner; and
   in response to the current temperature being less than a preset temperature, controlling the compressor to operate according to a second operating frequency greater than the first operating frequency.

2. The control method according to claim 1, wherein controlling the compressor to operate according to the second operating frequency includes:
   obtaining a duration during which the current temperature is less than the preset temperature; and
   in response to the duration being greater than or equal to a preset duration, controlling the compressor to operate according to the second operating frequency.

3. The control method according to claim 2, further comprising, after obtaining the duration:
   in response to the duration being less than the preset duration, resetting the duration.

4. The control method according to claim 1, wherein the second operating frequency is in a range from 55 Hz to 59 Hz.

5. The control method according to claim 1, wherein controlling the compressor to operate at the second operating frequency includes:
   controlling an operating frequency of the compressor to gradually increase from the first operating frequency to the second operating frequency.

6. The control method according to claim 5, wherein controlling the operating frequency of the compressor to gradually increase from the first operating frequency to the second operating frequency includes:
   controlling the operating frequency of the compressor to increase from the first operating frequency to the second operating frequency according to a preset adjustment value.

7. The control method according to claim 1, wherein obtaining the first operating frequency of the compressor includes:
   obtaining a plurality of operating frequencies of the compressor; and
   taking an average of the plurality of operating frequencies as the first operating frequency of the compressor.

8. The control method according to claim 1, further comprising, after obtaining the current temperature of the evaporator:
   in response to the current temperature being greater than or equal to the preset temperature, controlling the compressor to operate according to a rated frequency.

9. The control method of the air conditioner according to claim 1, wherein the current temperature of the evaporator is a temperature of a middle part of the evaporator.

10. The control method according to claim 1, wherein controlling the compressor to operate at the second operating frequency includes:
    obtaining a current mount of lubricating oil in the compressor;
    determining a return time span for lubricating oil to return to the compressor according to the current amount; and
    controlling the compressor to operate according to the second operating frequency for the return time span.

11. The control method according to claim 10, further comprising, after controlling the compressor to operate according to the second operating frequency for the return time span:

controlling an operating frequency of the compressor to return to the first operating frequency.

12. The control method according to claim 1, further comprising, after obtaining the first operating frequency of the compressor:

in response to the first operating frequency being less than the preset frequency, obtaining a duration during which the first operating frequency is less than the preset frequency; and in response to the duration being greater than or equal to a preset duration, controlling the compressor to operate according to the second operating frequency.

13. The control method according to claim 12, further comprising, after obtaining the duration during which the first operating frequency is less than the preset frequency:

in response to the duration being less than the preset duration, resetting the duration.

14. An air conditioner comprising:

a compressor;

an evaporator;

a memory storing a control program; and a processor configured to execute the control program to:

obtain a first operating frequency of the compressor;

in response to the first operating frequency being greater than or equal to a preset frequency, obtain a current temperature of the evaporator; and in response to the current temperature being less than a preset temperature, control the compressor to operate according to a second operating frequency greater than the first operating frequency.

15. The air conditioner according to claim 14, wherein the processor is further configured to execute the control program to:

obtain a duration during which the current temperature is less than the preset temperature; and in response to the duration being greater than or equal to a preset duration, control the compressor to operate according to the second operating frequency.

16. The air conditioner according to claim 15, wherein the processor is further configured to execute the control program to:

in response to the duration being less than the preset duration, reset the duration.

17. The air conditioner according to claim 14, wherein the second operating frequency is in a range from 55 Hz to 59 Hz.

18. The air conditioner according to claim 14, wherein the processor is further configured to execute the control program to:

control an operating frequency of the compressor to gradually increase from the first operating frequency to the second operating frequency.

19. The air conditioner according to claim 18, wherein the processor is further configured to execute the control program to:

controlling the operating frequency of the compressor to increase from the first operating frequency to the second operating frequency according to a preset adjustment value.

20. A readable storage medium storing a control program of an air conditioner, the control program, when being executed by a processor, causing the processor to:

obtain a first operating frequency of a compressor of the air conditioner;

in response to the first operating frequency being greater than or equal to a preset frequency, obtain a current temperature of an evaporator of the air conditioner; and in response to the current temperature being less than a preset temperature, control the compressor to operate according to a second operating frequency greater than the first operating frequency.

* * * * *